3,838,004
CALF DIARRHEA VIRUS VACCINE AND PROCESSES

Charles A. Mebus and Marvin J. Twiehaus, Lincoln, Nebr., assignors to Board of Regents of the University of Nebraska, Lincoln, Nebr.
No Drawing. Continuation-in-part of application Ser. No. 90,481, Nov. 17, 1970, which is a continuation-in-part of application Ser. No. 880,956, Nov. 28, 1969, both now abandoned. This application Nov. 10, 1971, Ser. No. 197,520

Int. Cl. C12k 7/00

U.S. Cl. 195—1.3                                       10 Claims

ABSTRACT OF THE DISCLOSURE

Calf diarrhea virus vaccines are prepared by passaging calf diarrhea virus obtained from feces of infected calves in tissue culture, particularly bovine or swine tissue culture, from one to about two hundred and fifty times.

---

This application is a continuation-in-part of copending application Ser. No. 90,481, filed Nov. 17, 1970 now abandoned, which is a continuation-in-part of application Ser. No. 880,956, filed Nov. 28, 1969; now abandoned.

This invention relates to calf diarrhea virus vaccines, methods of preparing said vaccines, and methods of using them.

In particular, the invention comprises a process of preparing calf diarrhea virus vaccines by passaging calf diarrhea virus in tissue culture, particularly, but not limited to, bovine or swine tissue culture.

The invention also comprises a method of immunizing newborn calves against calf diarrhea by administering to pregnant cows prior to the birth of said calves a vaccine prepared by passaging calf diarrhea virus in tissue culture up to about 250 times.

The invention further comprises a method of immunizing newborn calves against calf diarrhea by administering to said calves a vaccine prepared by passaging calf diarrhea virus in tissue culture up to about 250 times.

The invention also comprises the vaccines, when produced by the inventive methods.

Neonatal calf diarrhea, also known as calf scours or calf enteritis, is a serious, contagious disease of newborn calves. There have been numerous reports in the literature stating that *E. coli* is the cause of neonatal calf diarrhea. However, this disease cannot consistently be reproduced with *E. coli* isolated from cases of neonatal diarrhea. In addition, Smith and Halls, J. Path. and Bact. 93, 499–529 (1967), concluded that *E. coli* had not played an etiological role in 120 of 127 epidemiologically unrelated cases of diarrhea in colostrum-fed calves in various parts of the world.

Recently, Mebus et al. (University of Nebraska Research Bulletin 233, March 1969) have shown that neonatal calf diarrhea is a clinical entity a principal cause of which is a specific Reo-like virus. Consistent experimental reproduction of the disease verifying this finding was initially accomplished by inoculating feces collected from neonatal calf diarrhea field cases via a duodenal cannula into a newborn caught colostrum-deprived calf. This calf developed diarrhea 15 hours postinoculation. Its feces were collected and inoculated via a duodenal cannula into a hysterectomy-derived colostrum-deprived calf. Diarrhetic feces from this calf was passed in a similar manner in another hysterectomy-derived colostrum-deprived calf. Third, fourth and fifth virus passages in calves were accomplished using bacteria-free fecal filtrates inoculated via duodenal cannulas. Three calves in an isolation unit were inoculated orally with bacteria-free filtrates of the 6th calf passage of virus, and all were free of *E. coli* before and throughout the diarrhea period. A seventh calf passage using feces from one of these *E. coli*-free calves caused diarrhea 16 hours postinoculation.

Immunofluorescent staining (as described by Mebus et al., supra) of sections of small intestine from seventh passage calves revealed bright fluorescence in epithelial cells of the villi. Applying the immunofluorescent technique to dried fecal smears of field cases of neonatal calf diarrhea, this virus has been found in herds in Nebraska and in several other states. Fluorescence was not observed when the sections were stained with hog cholera or bovine virus diarrhea conjugates. A viral etiology of calf diarrhea therefore has now been clearly established.

The vaccines of the present invention accordingly are prepared from virus obtained by collecting feces of infected calves and filtering. The feces to be used are preferably collected from calves which have been previously inoculated with a bacteria-free filtrate of feces containing fluorescing cells. Passing the virus through one or more calves increases the virus titer in the collected feces and thereby aids subsequent growth of the virus in tissue culture for preparation of vaccine. If the virus originally obtained from feces will grow on tissue culture without further passaging in the calf, this virus material may be used. The feces so collected are diluted with phosphate-buffered saline, and the mixture is centrifuged at 1000 g. for about 30 minutes and filtered through a suitable bacteriologic filter. The filtrate containing virus then can be added to tissue culture for preparation of vaccine.

The tissue culture in which the virus is passaged include a variety of primary cells and cell lines, although bovine and swine cells are preferred. Among these materials are primary fetal bovine kidney cells, primary fetal bovine lung cells, primary fetal bovine thyroid cells, primary porcine kidney cells, primary fetal bovine choroid plexes cells, primary lamb kidney cells, bovine kidney cell line BK 1A, embryonic bovine trachea cell line EBTr (ATCC No. CCL 44), baby hamster kidney clone 21 cell line $BHK_{21}$ (ATCC No. CCL 10), Madin-Darby canine kidney cell line (ATCC No. CCL 22), green monkey kidney cell line VERO (ATCC No. CCL 81), pig kidney cell line PK–15 (ATCC No. CCL 33), swine testicle cell line ST (available from the National Animal Disease Laboratory, Ames, Iowa), and Henle's intestine (human embryo) cell lines HI, Hela, and LLC–$MK_2$ (ATCC Nos. CCL 6, 2, and 7, respectively). All the above substrates support to some degree the growth of the virus, although other primary cells and cell lines may also be used. The primary cells are obtained from healthy animals and grown according to standard methods well known to the art. The cell lines are either readily available from public depositories or may be grown and developed by known techniques.

In order to prepare the vaccines of this invention, the virus is first attenuated by passage in tissue culture. The cells are grown in a suitable growth medium. The cell sheets are then washed with a serum-free balanced salt solution. Virus is either added and allowed to adsorb onto the cells or is added directly to a suitable maintenance medium, which is in turn added to the cells. The cells are then incubated at a temperature of from 20–40° C., 28–38° being preferred. Growth of virus is permitted to continue until a noticeable cytopathologic effect is observed. This occurs within 2 to 10 days, and the medium containing the virus is then transferred to a new bottle containing tissue culture for additional passaging.

Choice of maintenance media is not critical and is within the normal skill of the art, except that it must not contain any material which inhibits virus growth. A serum-free maintenance medium is preferred. Among those which are suitable are Earle's or Hanks' balanced salt solutions containing 0.5% lactalbumin, 0.1% yeast extract, penicillin, and streptomycin, as well as Earle's or Hanks' base 199, 0.5% lactalbumin hydrolyzate, penicillin, and streptomycin.

Cytopathologic effect is apparent from the "flagging" produced, but infection is also followed by immunofluorescence. The virus passages may be conducted in satisfactory or roller bottle cultures. Use of high purity water in the culture media may be required.

At the conclusion of each passage, the medium and cells are harvested and then added to additional cells for further passaging. Subsequent passages are conducted, if needed, to obtain a suitable vaccine. For use in cows, low passage vaccine (virus) is satisfactory, as long as 85% or more of the cells fluoresce. For use in calves, the number of passages needed to prepare a suitable vaccine is determined by inoculating a vaccine of a particular passage level into susceptible calves. The desired passage level is one that itself causes no clinical illness when inoculated into the duodenum of a newborn colostrum-deprived calf and prevents illness when the calf is subsequently inoculated with a bacteria-free filtrate of feces containing virulent virus.

When the virus has been suitably attenuated, it may be propagated by growth in tissue culture. Virus is either added and allowed to adsorb onto the cells or is added directly to a suitable maintenance medium, preferably serum-free, which is then added to the cells. The cells are incubated and growth allowed to continue at 20–40° until a suitable viral titer, e.g. at least $10^5$ TCID/ml., is obtained.

The cow vaccine may be inactivated chemically and an adjuvant added for enhancement of antigenicity. Any of the known adjuvants may be used, including safflower oil, Freund's incomplete adjuvant, alginate adjuvant, and aluminum hydroxide adjuvant. The calf vaccine may be used in the liquid state or lyophilized and later reconstituted for inoculation with a suitable vehicle such as sterile water.

When directly immunizing neonatal calves, an attenuated or modified live vaccine should be used, one sufficient to create immunity without causing illness; such a vaccine will require up to about 250 passages. For optimum results, the calves should be immunized shortly after birth, i.e. before they have been exposed to virulent virus. When immunizing calves by administering vaccine to the pregnant mother, the vaccine should be one with a titer of at least $10^5$ TCID/ml., and preferably greater. The vaccines should be administered parenterally, preferably subcutaneously or intramuscularly, 60–90 days prior to calving.

The following examples illustrate the processes and products of the invention, but are not to be construed as limiting the scope thereof.

EXAMPLE 1

Primary fetal bovine lung cells, obtained from 8–9 month bovine fetuses by well-known techniques, were grown in Roux flasks containing Earle's lactalbumin hydrolyzate and 10% calf serum. Prior to inoculation, the cell monolayers were washed 2 or 3 times with Hanks' balanced salt solution. Following inoculation with calf passage fiscal filtrate, the virus was allowed to adsorb at 37° C. for two hours, with rocking of the bottle every half hour to redistribute the inoculum. Maintenance medium, consisting of Earle's balanced salt solution containing 0.5% lactalbumin and 0.1% yeast extract, plus penicillin and streptomycin, was added. The cells were then incubated at 37° C. until the sheet showed cytopathogenic effect or fluorescence with specific antibodies.

When 85 to 100% of cells in the monolayer fluoresced, the cells and fluid were harvested by freezing and thawing. The volume was reduced by 50% in an ultracentifuge.

The cells and fluid were stored at −60° C.

For evaluation of the vaccine, this cell-fluid mixture was thawed and tested both as such and mixed with an equal quantity of a safflower oil base adjuvant. The vaccine was injected intramuscularly into pregnant cows 60 days prior to calving. Eight cows were injected with the above-described tissue culture fluid, 7 cows were injected with the same amount of tissue culture fluid mixed with an equal quantity of adjuvant, and 6 cows were injected with 5 ml. of adjuvant mixed with 5 ml. of a viral suspension prepared from feces of experimental calves with neonatal diarrhea, as described by Mebus et al., as noted above for the preparation of antigen. Thirty-nine cows were left as nonvaccinated controls. The cows were sent to calve on a ranch where neonatal calf diarrhea had been a problem for several years and was then occurring. The efficacy of the vaccine was determined by observing the calves for diarrhea and testing the feces of the calves for presence of virus if diarrhea occurred. The virus was identified by immunofluorescence. The results are set forth in Table 1.

TABLE 1.—EFFICACY OF VARIOUS VACCINES AGAINST CALF DIARRHEA

| Vaccine | No. of cows | No. of calves born | No. of diarrhetic calves | |
|---|---|---|---|---|
| Tissue culture fluid | 8 | 8 | 7 | 87.5% |
| Tissue culture fluid plus adjuvant | 7 | 7 | 3 | 42.8% |
| Fecal virus plus adjuvant | 6 | 6 | 4 | 66.6% |
| No vaccine | 39 | 39 | 39 | 100% |

All control calves developed diarrhea; 7 of 8 calves from tissue culture-vaccinated cows developed diarrhea; 4 of 6 calves from fecal virus plus adjuvant-vaccinated cows developed diarrhea and 3 of 7 calves from tissue culture plus adjuvant-vaccinated cows developed diarrhea. It is apparent that all the vaccines had some efficacy, even in the face of a severe, possibly overwhelming, challenge of infection. The best results were obtained with the use of adjuvanted tissue culture fluid and cells.

On the basis of these results, the tissue culture plus adjuvant vaccine was evaluated in a dairy herd that had had a several neonatal calf diarrhea problem for two years and in which the virus had also been detected by immunofluorescence. Cows were selected for vaccination so there would be 5 vaccinated cows per week calving. They were vaccinated at 30 day intervals 30–90 days prior to parturition. Colostrum from vaccinated cows collected 0–5 days postcalving was then fed to calves 0–13 days old. Milk from vaccinated cows collected 6–10 days post calving was fed to calves 14 to 28 days old. The procedure permitted the evaluation of the interval required between vaccination and calving as well as effect of 2 doses of vaccine.

The data are summarized in Tables 2 and 3. In Table 2, the incidence of diarrhea in calves which received colostrum from non-vaccinated cows and from cows which received one dose of vaccine is tabulated. In Table 3, the incidence of diarrhea in calves which received colostrum from cows that had received two doses of vaccine is tabulated.

TABLE 2

Incidence of Calf Diarrhea in Animals Born of Cows Unvaccinated or Vaccinated Once

| | |
|---|---|
| No. calves | 180 |
| No. of diarrhetic calves | 87 (48.3%) |

TABLE 3

Incidence of Calf Diarrhea in Animals Born of Cows Vaccinated Twice

| | |
|---|---|
| No. Calves | 253 |
| Dates of Birth | Aug. 8, 1930–Oct. 10, 1924 |
| No. of diarrhetic calves (27.3%) | 69 |

It can be seen from these results that the incidence of neonatal calf diarrhea was reduced from 48.3% in 180 calves to 27.3% in 253 calves by vaccination more than once.

Further improvement should be obtainable by ensuring that all newborn calves are fed colostrum from vaccinated cows as soon as possible after birth. In the above experiment, for unavoidable reasons, up to 12 hours elapsed before some calves were fed. The disease thus might have been established already in some animals before receiving the colostrum.

In the above experiments, no adverse effect was observed in any of the vaccinated animals.

EXAMPLE 2

Other vaccines for administration to pregnant cows are prepared by passaging virus which has been adapted to grow in bovine, swine, or other primary cell or cell line tissue cultures by prior passaging, if necessary, in calves. The number of passages for a suitable vaccine is that necessary to obtain 85–100% fluorescence of the cells.

EXAMPLE 3

A vaccine for direct immunization of calves was prepared by passaging the virus in cells of the pig kedney cell line PK–15 (ATCC No. CCL 33) 37 times according to the procedure of Example 1. The passages were conducted in stationary tubes.

EXAMPLE 4

Other calf vaccines can be prepared by passaging virus which has been adapted to grow in bovine, swine, or other primary cell or cell line tissue cultures by prior passaging, if necessary, in calves. The number of passages for a suitable vaccine is determined by testing material for its infectious and antigenic properties.

EXAMPLE 5

Fecal material (10 ml.) is collected from field cases of neonatal calf diarrhea and then refrigerated or quick-frozen. The feces are screened by the fluorescent antibody method or electron microscopy for the presence of virus. The material containing virus is diluted with a three-fold volume of phosphate buffered saline, the mixture is centrifuged and put through a bacteriological filter. A $5\mu$ Seitz filter, then a $1\mu$, and then a $0.5\mu$ filter are used. Then 30 ml. is inoculated into the duodenum of a calf. Instead of filtering the material, the whole feces may be directly inoculated.

Feces are collected from the animal as soon as diarrhea has begun. The feces are treated in the same manner as above and passed via duodenal injection two or more times. After each calf passage, a filtrate is prepared and inoculated onto primary bovine kidney cells or primary bovine lung cells in stationary or rolling culture tubes or bottles. Up to 4 passages are made in these cells, the cells being examined for a flagging-type cytopathologic effect and monitored by the fluorescent antibody method. If neither is observed, the cells are discarded. If virus is detected, further passages are conducted.

EXAMPLE 6

The virus was passaged 40 times at 37° in PK–15 pig kidney cells. It was then passaged 135 more times at 37° in primary bovine kidney cells. For the bovine kidney passages, the virus at first was passed every 3 or 4 days by inoculating an 8 oz. bottle with 1 ml. of infected tissue culture fluid. Prior to inoculation, the cells were washed 3 times with Hanks' balanced salt solution. At first virus was adsorbed for 2 hours before maintenance medium was put on, and later for only 1 hour. After about the 70th bovine kidney passage, the virus was passed every day. Beginning with the 120th passage, the virus was not absorbed. The bottles were washed, maintenance medium was then added, and the cells inoculated with the virus fluid.

Tissue culture fluid from the 80th to the 175th total passage level, harvested 5 days after inoculation, has been mixed with an equal quantity of safflower oil base adjuvant and inoculated into pregnant cows. The incidence of diarrhea in calves from these cows was reduced about 50% and mortality almost eliminated.

EXAMPLE 7

The virus was passaged 40 times at 37° in PK–15 pig kidney cells, 85 times at 37° in primary bovine kidney cells, and 17 times at 31° in primary bovine kidney cells. The resulting tissue culture fluid, when harvested and inoculated (12 ml.) into the duodenum of a Caesarian-section colostrum-deprived calf, caused no illness.

EXAMPLE 8

Fecal material from field cases of neonatal calf diarrhea was processed as in Example 5 and passed through 2 duodenal passages. The resulting fecal filtrate was then passaged in roller tubes containing primary bovine kidney cells. Stationary bottles were used starting with the 3rd passage. 163 passages were made at 37° and the resulting tissue culture fluid containing virus, when combined with adjuvant and injected into pregnant cows, effectively protected the calves from disease-caused mortality and greatly lowered the incidence of diarrhea.

EXAMPLE 9

Tissue culture fluid containing virus from 114 passages at 37° was then passed 16 more times at 31°. The fluid was injected into calves 4 hours old. When the calves were challenged with virulent virus when 28 hours old, they did not develop illness.

EXAMPLE 10

A vaccine may be prepared by duodenally passaging fecal material from diarrhetic calves from 1 to 4 times in calves and then passaging the resulting fecal material in a swine testicle cell line until the tissue culture fluid, when injected duodenally into calves, no longer produces illness.

EXAMPLE 11

Fecal material from field cases of neonatal calf diarrhea was processed as in Example 5 and passed through 2 duodenal bacteria-free calf passages. The resulting fecal filtrate was then passaged in primary bovine kidney tissue culture 114 times at 37° and 60 times at 30°. It was further passaged 20 times at 37° in a bovine kidney cell line to achieve suitable attenuation.

The virus in the resulting tissue culture fluid can be propagated in the bovine kidney cell line at about 36° to obtain a suitable virus titer and then harvested.

We claim:

1. A process for attenuating virulent reo-like calf diarrhea virus comprising passaging the said calf diarrhea virus identified by immunofluorescence in tissue culture which supports growth of the virus, continuing until a noticeable cytopathological effect is observed, said cytopathological effect being apparent from flagging produced or infection followed by immunofluorescence, from 37 to 250 times until the virus, while inducing immunity in neonatal calves, does not produce disease.

2. A process as claimed in claim 1, in which the virus is passaged from 80 up to about 250 times in bovine or swine tissue culture at 20–40°.

3. A process as claimed in claim 2, in which the virus is passaged in bovine kidney tissue culture at 28–38°.

4. A process as claimed in claim 2, in which the virus is passaged in swine kidney cells at 28–38°.

5. A process as claimed in claim 3, in which the virus is passaged through 2 duodenal calf passages, through 114 primary bovine kidney passages at 37°, 60 primary bovine kidney passages at 30°, and 20 bovine kidney cell line passages at 37°.

6. A process for preparing a further quantity of calf diarrhea virus comprising further growing in bovine kidney tissue culture reo-like calf diarrhea virus that has already been atenuated, said further growth being for a period of time sufficient to permit growth of a larger amount of said virus, and harvesting the resulting virus material.

7. A process as claimed in claim 4, in which the virus is passaged through 130–250 primary bovine kidney passages at 30–37°.

8. A process for preparing a further quantity of calf diarrhea virus comprising further growing in bovine kidney cell culture reo-like calf diarrhea virus that has already been attenuated by the process of claim 7, said further growth being for a period of time and number of passage sufficient to permit growth of a larger amount of said virus, and harvesting the resulting virus material.

9. A process as claimed in claim 7, in which the virus is passaged approximately 194 times.

10. A process for preparing a further quantity of calf diarrhea virus comprising further growing in bovine kidney cell culture reo-like calf diarrhea virus that has already been attenuated by the process of claim 9, said further growth being for a period of time and number of passages sufficient to permit growth of a larger amount of said virus, and harvesting the resulting virus material.

References Cited

UNITED STATES PATENTS 3,293,129  12/1966  Baker _____ 424—89

OTHER REFERENCES

Mebus et al.: University of Nebraska College of Agric. & Home Blon., Res. Bull 233, March 1969.

Mebus et al.: Proc. 73rd Ann. Mtg. U.S. Animal Health Assoc., October 12–17, 1969, pp. 97–99.

Welch: Canad. J. Comp. Med. 35: 195–202 (1971).

Mebus et al.: Canad. Vet. Journal 12, 69–72 (1971).

Mebus et al.: Vet. Med/Small Anim. Clin. 67: 173–178 (1972).

Stair et al.: Amer. J. Vet. Res. 33: 1147–1155 (1972).

Mebus et al.: Amer. J. Vet. Res. 34: 145–150 (1973).

Mebus et al.: Vet. Path. 11: 375 (1973).

SHEP K. ROSE, Primary Examiner

U.S. Cl. X.R.

424—89

UNITED STATES PATENT AND TRADEMARK OFFICE
CERTIFICATE OF CORRECTION

PATENT NO. : 3,838,004
DATED : September 24, 1974
INVENTOR(S) : Charles A. Mebus and Marvin J. Twiehaus It is certified that error appears in the above-identified patent and that said Letters Patent are hereby corrected as shown below:

In claim 7, "claim 4" should read --claim 3--.

Signed and Sealed this

Eighteenth Day of September 1979

[SEAL]

Attest:

LUTRELLE F. PARKER

Attesting Officer     Acting Commissioner of Patents and Trademarks